May 20, 1924.
G. E. KEEFER
FUSE
Filed Dec. 30, 1920    2 Sheets-Sheet 1
1,495,078
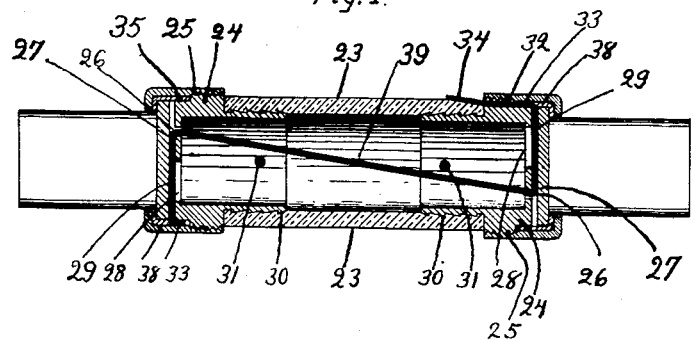
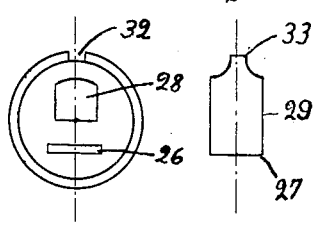 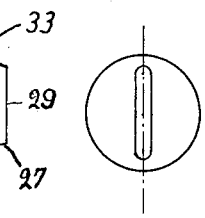 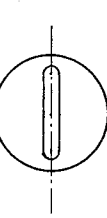 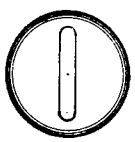 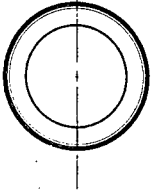
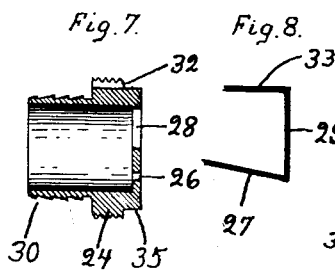 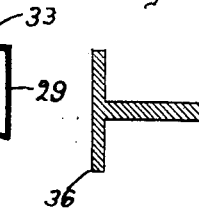 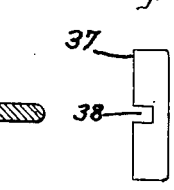 
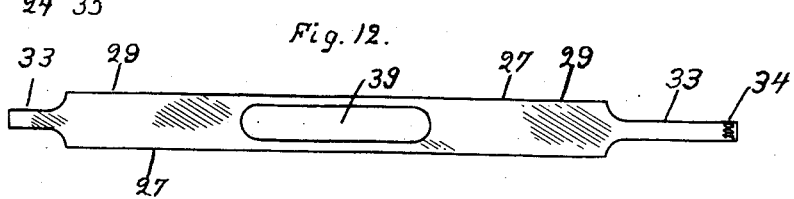
WITNESSES:
INVENTOR
G. E. Keefer.

May 20, 1924.  
G. E. KEEFER  
FUSE  
Filed Dec. 30, 1920   2 Sheets-Sheet 2
1,495,078
Fig. 13.
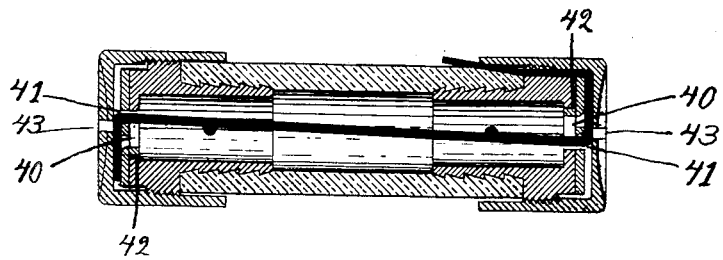
Fig. 14.  Fig. 15.  Fig. 16.  Fig. 17.
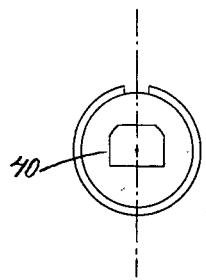 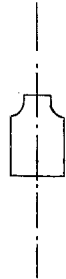 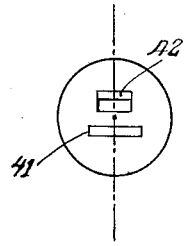 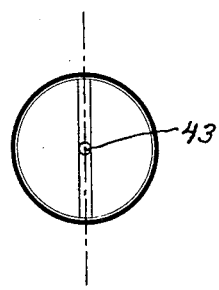
Fig. 18.  Fig. 19.  Fig. 20.  Fig. 21.
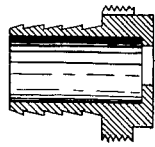  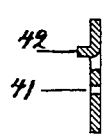 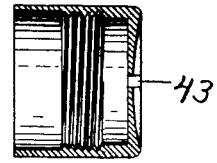
Fig. 22.
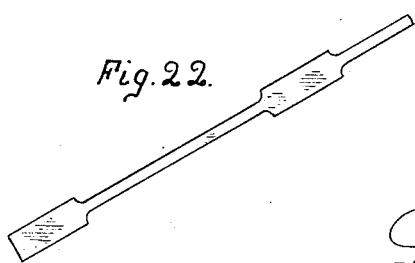
WITNESSES:  INVENTOR  
G. E. Keefer Patented May 20, 1924.

1,495,078

UNITED STATES PATENT OFFICE.

GLEN E. KEEFER, OF WESTPORT, CONNECTICUT.

FUSE.

Application filed December 30, 1920. Serial No. 434,046.

*To all whom it may concern:*

Be it known that I, GLEN E. KEEFER, a citizen of the United States, residing at Westport, in the county of Fairfield and State of Connecticut, have invented certain new and useful Improvements in Fuses; and I do hereby declare the following to be an exact description of my invention.

My invention pertains to refillable cartridge fuses of the electrical class which are capable of being recharged anywhere when the electrical conductor, or as hereinafter called the fusible link, has melted and which fuse may be used repeatedly by simply inserting a new link.

The first object of my invention is to provide a renewable cartridge fuse of the "knife blade" type which cannot be easily overloaded by using an incorrect size or a multiplicity of fusible links; thus affording complete protection to the electrical circuit at all times. This feature is attained by so constructing the fuse that the width of the fusible link will not permit its use in a cartridge designed for a smaller size of link while a second link adds twice the thickness of the fusible element to the length of the fuse, consequently the use of two or more links increases the length, to such an extent, that only with difficulty can it be inserted in the regulation fuse blocks. It will be seen by those skilled in the art that this construction effectually overcomes the present practice of bolting two or more fusible links in parallel to the same fuse terminals.

The second object of my invention is to provide a renewable cartridge fuse in both the "ferrule" and "knife blade" types, which by means of threaded construction, do not require any tools, whatever, to replace the blown link.

The third object of my invention is to provide a flame proof renewable cartridge fuse, which has the exact size of the fusible link stamped thereon and which stamping, is at all times, in plain view on the exterior of the cartridge, thus affording unquestionable evidence of the size previously used. I am aware that this feature is claimed for in certain renewable cartridge fuses but said fuses have the link inclosed in an auxiliary container or cartridge which fits inside the permanent cartridge; the auxiliary container being filled with asbestos, chalk or other arc quenching substance. I have found, however, when such fuses are blown, that the auxiliary container usually becomes jammed in the case due to expansion of the gases resulting from the volatilization of the link; and consequently necessitates considerable time in replacing said link. I am also aware that non-powder filled renewable cartridge fuses have been invented heretofore, but none of the said fuses, having the link plainly showing at all times, are of a simple flame proof construction, when subjected to the regulation tests.

The flame proof construction, in my novel fuse, is obtained by providing a long passage way for the gases resulting from the volatilization of the link and which passage way, when correctly proportioned, regulates the flow of escaping gas and affords ample cooling surface to extinguish the flame before reaching the exterior of the cartridge. This construction prevents the gas escaping through the threads of the ferrules and, consequently, eliminates the great detrimental feature found in present commercial fuses, where such vent is used. I have found that the volatilized metal, passing through the threads, is chilled, consequently, more or less quantities of metal is deposited; thus making a renewal, in many instances, impossible.

I have also found, by recent investigations, that the instantaneous gas pressure, in the small chambers at the ends of the fuse, and which chambers are formed by the link, is approximately the same as in the interior cartridge itself. This equalization of pressure is due to:

*a*, the enormous gas pressure produced when the link is volatilized; *b*, the impossibility of sufficiently closing the aperture between the said chambers; *c*, the great difference in size of the respective chambers; *d*, the restricted passage-way whereby the gas is cooled and finally escapes.

A fourth object of my invention is to provide a renewable cartridge fuse; in which the gases from the volatilized link are reduced to a minimum in order to lessen, as much as possible, the disruptive force generated. I am aware that similar attempts have been made, heretofore, but at great expense for the dies involved. In my invention I prefer to use zinc or other suitable electrical conducting material and remove a large portion of metal from the center to form the blowing point at the sides. This method necessitates the use of one die only; in order to manufacture all of the different sizes, consequently, a considerable saving is made in tool and die expense.

A further object resides in the provision of a ferrule formed of a different metal than the metal of the bushings so that in the subjection of these two parts to heat the expansion can be regulated to prevent the ferrule sticking on the bushing, whereby only with great difficulty can the ferrule otherwise be removed until the fuse has cooled off.

The objects of my invention and the general construction will be more readily understood now by referring to the accompanying drawings; with the numerals of reference marked thereon; and which form a part of this specification:—

Figure 1 is a longitudinal section through, what is general known as, the "knife blade" type of my improved fuse.

Figures 2, 3, 4, 5, and 6 are the end views of the various parts in their respective order, which form either end of my fuse, while Figures 7, 8, 9 and 11 are transverse sectional views as indicated, while Figure 10 is a front view of Figure 5. These parts are shown completely assembled in Figure 1.

Figure 12 is a general view of my novel fusible link and is also partly illustrated in Figures 3 and 8.

Figure 13 is a longitudinal section through the "ferrule" type of my improved fuse.

Figures 14, 16, 15 and 17 are the end views of the various parts, in their respective order, and which compose either end of my fuse; while Figures 18, 20, 19 and 21 are transverse sectional views of the above, and as shown completely assembled in Figure 13.

Figure 22 is a view of a link now in general use and which style may be used in the "ferrule" type of my fuse in place of the one as illustrated in Figure 12.

Again referring to these figures, for convenience, I have named the parts, of my knife blade type, as shown in Figures 2 and 7, the bushing; Figures 3 and 8, the link; Figures 4 and 9, the terminal blade, or T bar; Figures 5 and 10, the auxiliary ferrule; and Figures 6 and 11, the outside ferrule.

In the ferrule type of my novel fuse, Figures 14 and 18 are the bushing; Figures 16 and 20, the bridge; Figures 15 and 19, the fusible link; and Figures 17 and 21, the ferrule.

The cylindrical fuse casing 23 is preferably of fibre or other suitable electrical non-conducting material. The bushing, Figures 2 and 7, is of brass, steel or other suitable metal or combination of metals; whose coefficient of expansion is, preferably, less than that of the ferrule, shown in Figure 11. I have found that this is an especially important feature as the expansion of the threads on the bushing 24 (due to the internal heat accompanying the volatilizing of the link) takes place more rapidly than the expansion of the threads 25 on the ferrule; consequently using a metal, having a greater expansion coefficient for the ferrule, tends to off-set the lag in temperature rise and permits making a renewal, quickly and easily, while the fuse is hot.

The face of the top of the bushing is equipped with two apertures, as shown in Figures 2 and 7. The aperture 26 is for receiving that part of the fusible link designated as 27 while the aperture 28 is for removing the residue of the melted link. When my novel fuse is in use this aperture 28 is closed by that portion of the fusible link 29, also shown in Figure 3, which is folded over it as best shown in Figure 1.

The external diameter of the bushing 30, at the opposite end, is slightly greater than the internal diameter of the fuse casing 23. The external surface of the bushing at this end is equipped with circumferential barbs similar to saw-teeth, or other suitable engaging surface to prevent removal from the fuse casing.

Several methods may be used for assembling the bushings and fuse casing but I prefer to line up the apertures 28, 28, as shown in Figure 1, exactly diametrically opposite and then, when great pressure is exerted against the faces of the bushings, they slide into correct position. They are then prevented from turning by holes being drilled through both casing and bushing and the pins 31, 31 being inserted, as shown in Figure 1.

The bushing, at one end of the casing, has a recess 32, milled parallel with its axis and whose breadth and depth are substantially the same as the width and thickness of that portion of the link, designated as 33, 33. Through this recess 32 I not only vent the gases resulting from the partial volatilization of the fusible link but also, bring out, to the exterior of the fuse, that portion 34 of the fusible link in order to clearly show the size stamped thereon. By using the proper materials, correctly proportioning the various dimensions and utilizing this indicator recess for venting the gases, I have perfected a fuse of flame proof construction; when subjected to the most severe operating conditions; and a fuse which can be speedily renewed, without tools, while hot.

Figures 4 and 9 show a terminal made from copper, or other suitable electrical conducting material, with circular base attached thereto by riveting, welding or other suitable means.

Figures 5 and 10 show a shallow auxiliary ferrule whose exterior diameter is the same as that of the bushing, at the base of the threads 24. The top of this auxiliary ferrule has an aperture similar in size and shape to the blade of the T bar, as illustrated in Figures 4 and 5. The two are assembled by the blade passing through the aperture and held together by a snug fit between the base of the T bar 36 and the interior wall of the ferrule 37 and thus held except when forced apart when cleaning.

The thickness of the wall of the auxiliary ferrule is slightly less than the thickness of the link indicator, while one edge of the wall, in alignment with the T bar aperture, has a notch 38 which engages that portion of the fusible link designated by 33 so that perfectly flexible alignment, of the blades, is afforded. The lower edge, of this auxiliary ferrule, forms a sleeve over that portion of the bushing designated by 35. A secondary purpose of this auxiliary ferrule is to afford additional cooling surface for the incandescent gas, resulting from the volatilization of the link.

It is important, as I have previously pointed out, that the coefficient of expansion of the metals, forming the outside ferrule, is preferably greater than that of the bushing, owing to the uneven rate of expansion, due to the internal heat. For example, I have found that by using brass (whose coefficient of expansion is approximately .0000187° C.) for the outside ferrule (Figures 6 and 11) and a soft untempered steel (whose coefficient of expansion is approximately .0000110° C.) for the bushing (Figures 2 and 7) that greater freedom in the removal of the outside ferrule results; than when the same metal is used for both.

The exterior surface of this ferrule is knurled in order to afford ample gripping surface. Excellent contact is secured by the base of the T bar being clamped firmly against the flat portions of the link, as shown in Figure 1, by the threads 25 of the ferrule engaging those of the bushing 24.

To renew my novel fuse it is only necessary to unscrew the two ferrules by hand and remove the residue of the old link. A new link is then inserted through the link apertures 26, 26 and the portions of the link 29, 29 folded flat against the faces of the bushing. The ends of the link 33, 33 are then folded over the edges of the bushing 35 and one end 34 placed in the recess 32. The outside ferrules together with the auxiliary ferrules and T bar terminals are then replaced and, as the ferrules are screwed in place, the notches 38, 38 in the auxiliary ferrules engage the portions 33, 33 of the link and the blades are automatically thrown into alignment.

To one skilled in the art it is apparent that considerable difficulty would be experienced in attempting to overload my novel fuse. For instance the aperture 26 is the only one of sufficient width to accommodate the fusible link and have the tab 34 of the link fall in the recess 32. Should an attempt be made to use two or more fusible links the combined thickness is too great to pass through the aperture 26. If the length of the fuse is increased there is insufficient clearance between the ends of the cartridge and the edges of the fuse clips to insert the fuse without changing the clips.

Should a plain strip of metal be used, in place of my novel fusible link, the tab recess 32 will remain blank and the attempt at overloading is apparent without disassembly.

My novel fusible link is made from zinc or other suitable metal and has the center, 39, removed thus leaving two tongues, one at either side, connecting the two ends. This construction is clearly shown in Figure 12. The construction greatly reduces the amount of metal volatilized, consequently greatly reduces the disruptive force generated.

I propose to purchase the metal in standard widths (one for each diameter of cartridge used) and calibrate the links by varying the thickness for the various subsizes. For example; the thickness of a 65 ampere link is .0245 inches and for the 100 ampere link it is .0375 inches while the width in each instance is 27/64 inches. It will be readily seen, by those skilled in the art, that a great saving in tool cost is accomplished by this method as only one size of die is required to stamp the various sizes.

The general construction of my ferrule type fuse is practically the same as the knife blade type, as heretofore described, with the exception of some slight changes necessitated by its smaller dimensions. The face of each bushing has an aperture, 40, and this is partially closed by an auxiliary member called a bridge. This is shown in Figures 16 and 20. The purpose of this bridge is to provide a base for supporting the link; Figures 15 and 19. Contact is formed with the link and the bottom of the ferrule by the threads of said ferrule Figure 21, engaging the threads of said bushing Figure 18, as shown completely assembled in Figure 13; thus bringing pressure to bear between the bottom of the ferrule and the surface of the link.

The bridge has an aperture 41, of proper width to accommodate the fusible link while the projecting member, 42, locates the bridge in position by bearing against one side of the aperture, 40, in the top of the bushing.

The ferrule, as shown in Figures 17 and 18

21, is provided with a small aperture, 43, for additional venting of the gas; which escapes between the surfaces of the link and the ferrule. The ferrule also has a small recess across the end to accommodate a screw-driver when too hot for convenient removal by hand.

It will be readily seen, by those skilled in the art, that other methods of construction may be followed; such as using a powder-filler, especially for fuses of the higher voltages, and using additional parts to secure a flame-tight construction in the fusible link etc. without departing from the spirit or scope of my invention.

What I claim is:

1. A fuse having a threaded bushing at one end thereof and a threaded ferrule or cap to engage with the bushing, said bushing having a longitudinal slot therein to receive a link the end of which extends beyond the ferrule, the link being of a width and thickness sufficient to result in a tight fit between the link, the bushing and the ferrule whereby a flame-tight joint is provided between the interior of the fuse and the atmosphere.

2. A cartridge fuse which comprises a chamber having an end closure portion, said closure provided with a cleaning aperture and an aperture permitting the passage therethrough of a fusible link, said link being bent over to cover the cleaning aperture when the parts of the fuse are assembled so as to enclose the interior of the cartridge.

3. A cartridge fuse which comprises a body portion, a metallic bushing on the end thereof threaded and having a longitudinal slot across the threads at one point, an end closure for the body portion having an aperture to permit the passage therethrough of a fusible link, the size of the aperture being substantially identical with the cross section of the link, said link being bent up along the end of the bushing and passing through the slot, and a threaded ferrule or cap to engage with the bushing to hold the parts together.

4. A cartridge fuse which comprises a body portion, a metallic bushing on the end thereof threaded and having a longitudinal slot across the threads at one point, an end closure for the body portion having an aperture to permit the passage therethrough of a fusible link, the size of the aperture being substantially identical with the cross section of the link, said link being bent up along the end of the bushing and passing through the slot, and a threaded ferrule or cap to engage with the bushing to hold the parts together, the thickness of the link being such as to permit the engagement therewith of the threads on the ferrule whereby a flame-tight joint is formed.

5. A cartridge fuse which comprises a threaded metallic bushing formed of a certain material, and an interiorly threaded cap or ferrule to engage with the bushing and formed of a different material, the coefficients of expansion of the two materials being selected so that when the fuse blows the expansions are related to prevent the ferrule from jamming on the bushing.

6. A cartridge fuse which comprises a bushing secured to an end of the cartridge, a plurality of threads disposed along the outer surface of the bushing, a smooth shoulder formed on the end of said bushing, and a cap of thin metal disposed over the bushing in engagement with said shoulder.

7. A cartridge fuse which comprises a metallic bushing secured to the end thereof, a plurality of threads on the outer surface of the bushing at the inner edge thereof, a smooth shoulder adjacent the outer edge of the bushing, a link extending through the fuse, a closure portion on the end of the fuse having an aperture of substantially the same cross section as the link to permit its passage therethrough, a cleaning aperture in the closure, said link being bent to cover the cleaning aperture, said bushing having a groove through the threaded portion to permit the passage of the end of the link therethrough to the atmosphere, a metallic cap of thin metal disposed over the end of the bushing having a slot cut therein to receive the portion of the link with which it engages, a terminal plate disposed against the link and beneath the thin metallic cap, and a threaded flanged ferrule screwed over the bushing, the flange of the ferrule engaging the rear face of the cap to hold the cap, the plate and the link tightly together, the thin metallic cap forming a medium for the ready disposition of the heat generated when the link burns out.

8. A cartridge fuse which comprises a metallic bushing secured to the end thereof, a plurality of threads on the other surface of the bushing at the inner edge thereof, a smooth shoulder adjacent the outer edge of the bushing, a link extending through the fuse, a closure portion on the end of the fuse having an aperture of substantially the same cross section as the link to permit its discharge therethrough, a cleaning aperture in the closure, said link being bent to cover the cleaning aperture, said bushing having a groove through the threaded portion to permit the passage of the end of the link therethrough to the atmosphere, a metallic cap of thin metal disposed over the end of the bushing having a slot cut therein to receive the portion of the link with which it engages, a terminal plate disposed against the link and beneath the thin metallic cap, and a threaded flanged ferrule screwed over the bushing, the flange of the ferrule engaging the rear face of the cap to hold the cap, the plate and the link tightly together, the thin metallic cap forming a medium for the ready disposition of the heat generated when the link burns out, the thickness of the link being sufficient to permit the threads on the ferrule to engage therewith whereby the tightness of the joint between the bushing, the ferrule and the link is enhanced to prevent the passage of flame therethrough.

9. A cartridge fuse which comprises a cylindrical casing, a pair of bushings disposed at the ends of the casing, the ends of the bushings being closed and provided with apertures therein, a fusible link extending through said casing, one of said bushings having threads on its outer face and a slot therethrough through which the end of the fusible link passes to provide an indicating end, and ferrules engaging the bushings and adapted to be threaded thereon, electrical contact being formed between the link the ferrules and the bushings.

10. A cartridge fuse which comprises a cylindrical casing, a pair of bushings disposed at the ends of the casing, the ends of the bushings being closed and provided with apertures therein, a fusible link extending through said casing, one of said bushings having threads on its outer face and a slot therethrough through which the end of the fusible link passes to provide an indicating end, and ferrules engaging the bushings and adapted to be threaded thereon, electrical contact being formed between the link, the ferrules and the bushings, the temperature coefficient of the ferrules being at least equal to that of the bushings.

11. A cartridge fuse which comprises a cylindrical body portion, metallic bushings at each end of the body portion, a fusible link mounted within the body portion, one end of the link passing around the bushing at that end and through a slot in one of the bushings so that the end of it is exposed to form an indicator portion, and a threaded cap engaging the bushing, the threads of the cap engaging the link to make a flame-tight joint therebetween.

12. A cartridge fuse which comprises an enclosed casing, a fusible link extending through said casing, a bushing at one end of said casing having an exterior threaded portion with a slot therein, and a ferrule engaging said threaded portion, said link passing around the end of the bushing and through said slot to expose one end thereof outside the fuse to function as an indicator portion, the threads on the ferrule or cap engaging the threads on the bushing and the metal of the link to form a flame-tight joint.

13. A cartridge fuse having an insulating casing with fixed end bushing externally threaded, said bushing having a shallow longitudinal channel through its threaded area to receive the bent-over end of a fuse strip, in combination with an internally threaded ferrule fitting over said bushing and engaging the threaded area thereof, the threads on the ferrule being adapted to engage the exterior of a fuse strip lying in said channel and to effect a seal therewith to substantially prevent the escape of gases through said channel.

14. In a cartridge fuse, a substantially closed fuse chamber having an exit for the fuse strip, a blade terminal having a base flange adapted to bear against an offset end of the fuse strip, a thimble encasing said blade base and the end of the fuse chamber, and a screw ferrule enclosing the thimble and base of the blade terminal and serving to hold the parts assembled at the end of the fuse chamber.

15. A cartridge fuse which comprises a body portion having a chamber and an end closure portion, said closure provided with an aperture permitting the passage therethrough of a fusible link, said fuse having a passage through which the indicating end of the link is brought out to the exterior of the fuse, said passage, when the link is in place, being sufficiently tight to prevent the passage therethrough of incandescent gas.

16. A cartridge fuse which comprises a body portion having a chamber and an end closure portion, said closure provided with an aperture permitting the passage therethrough of a fusible link, said fuse having a passage through which the indicating end of the link is brought out to the exterior of the fuse, said passage, when the link is in place, being sufficiently tight so that as the gas is exhausted therethrough its temperature is reduced sufficiently to prevent the ignition of surrounding substances.

In witness whereof, I hereunto subscribe my name this 17th day of December, A. D. 1920.

GLEN E. KEEFER.

Witnesses:
EDMOND C. SMITH, Jr.,
FRANCIS MALINAK.